US012327935B2

(12) United States Patent
Zhang et al.

(10) Patent No.: US 12,327,935 B2
(45) Date of Patent: Jun. 10, 2025

(54) ANTENNA AND DISPLAY DEVICE

(71) Applicants: BEIJING BOE TECHNOLOGY DEVELOPMENT CO., LTD., Beijing (CN); BOE TECHNOLOGY GROUP CO., LTD., Beijing (CN)

(72) Inventors: Yafei Zhang, Beijing (CN); Dongdong Zhang, Beijing (CN); Mengxia Yu, Beijing (CN); Feng Qu, Beijing (CN)

(73) Assignees: BEIJING BOE TECHNOLOGY DEVELOPMENT CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/041,817

(22) PCT Filed: Feb. 17, 2022

(86) PCT No.: PCT/CN2022/076698
§ 371 (c)(1),
(2) Date: Feb. 16, 2023

(87) PCT Pub. No.: WO2023/155110
PCT Pub. Date: Aug. 24, 2023

(65) Prior Publication Data
US 2024/0275055 A1 Aug. 15, 2024

(51) Int. Cl.
*H01Q 9/04* (2006.01)
*H01P 1/00* (2006.01)
(Continued)

(52) U.S. Cl.
CPC ............... *H01Q 9/045* (2013.01); *H01P 1/00* (2013.01); *H01Q 1/22* (2013.01); *H01Q 21/065* (2013.01);
(Continued)

(58) Field of Classification Search
CPC ........ H01Q 9/045; H01Q 1/22; H01Q 21/065; H01Q 1/24; H01Q 1/243; H01Q 21/08;
(Continued)

(56) References Cited

U.S. PATENT DOCUMENTS 6,340,948 B1 * 1/2002 Munoz-Garcia ....... H01Q 21/22 342/373
2020/0021008 A1 * 1/2020 Yong .................... H01Q 21/005
(Continued)

FOREIGN PATENT DOCUMENTS

CN 112612323 A 4/2021
CN 112612374 A 4/2021
(Continued)

*Primary Examiner* — Hoang V Nguyen
*Assistant Examiner* — Yonchan J Kim
(74) *Attorney, Agent, or Firm* — XSENSUS LLP

(57) ABSTRACT

An antenna includes at least one feed line including a first feed line, and a plurality of first patch units serially connected to the first feed line in an extending direction of the first feed line. The first feed line and/or the plurality of first patch units each have a mesh structure, and the mesh structure is composed of a plurality of conductive lines. Of the plurality of conductive lines, a distance between two conductive lines that are adjacent and do not intersect is greater than or equal to a maximum width of any conductive line, and is less than or equal to a minimum width of any feed line.

17 Claims, 11 Drawing Sheets

(51) Int. Cl.
*H01Q 1/22* (2006.01)
*H01Q 21/06* (2006.01)
*G09G 3/3225* (2016.01)

(52) U.S. Cl.
CPC ... *G09G 3/3225* (2013.01); *G09G 2300/0819* (2013.01); *G09G 2300/0842* (2013.01)

(58) Field of Classification Search
CPC . H01Q 1/38; H01Q 21/00; H01P 1/00; G09G 3/3225; G09G 2300/0819; G09G 2300/0842
See application file for complete search history.

(56) References Cited

U.S. PATENT DOCUMENTS

| | | | | |
|---|---|---|---|---|
| 2020/0182964 | A1* | 6/2020 | Di Nallo | G01S 13/0209 |
| 2021/0066813 | A1 | 3/2021 | Salman | |
| 2023/0006356 | A1* | 1/2023 | Yoon | H01Q 9/065 |
| 2023/0017270 | A1* | 1/2023 | He | H01Q 3/22 |
| 2023/0089629 | A1* | 3/2023 | Ouyang | H01Q 1/243 343/720 |

FOREIGN PATENT DOCUMENTS

| | | | |
|---|---|---|---|
| CN | 113316867 | A | 8/2021 |
| CN | 113394562 | A | 9/2021 |
| CN | 113937483 | A * | 1/2022 |

* cited by examiner

ANTENNA AND DISPLAY DEVICE

CROSS-REFERENCE TO RELATED APPLICATION

This application is a national phase entry under 35 USC 371 of International Patent Application No. PCT/CN2022/076698, filed on Feb. 17, 2022, which is incorporated herein by reference in its entirety.

TECHNICAL FIELD

The present disclosure relates to the field of communication technologies, and in particular, to an antenna and a display device.

BACKGROUND

Millimeter Wave (mmWave) is an electromagnetic wave with an operating frequency of 30 GHz to 300 GHz and with a wavelength in the millimeter range, and often includes a frequency band above 24 GHZ. High gain millimeter beams is capable of penetrating a variety of non-metallic materials such as plastic, gypsum boards and clothing fabric, and is less affected by environmental conditions such as rain, fog, dust, and snow. In addition, the size of the antenna required for transmission of the millimeter wave is relatively small, and the detection precision is high. Therefore, the antenna required for the transmission of the millimeter wave has wide application and is favored by the market.

SUMMARY

In an aspect, an antenna is provided. The antenna includes at least one feed line and a plurality of first patch units. The at least one feed line includes a first feed line. The plurality of first patch units are serially connected to the first feed line in an extending direction of the first feed line. At least one of the first feed line and the plurality of first patch units each have a mesh structure, and the mesh structure is composed of a plurality of conductive lines. Of the plurality of conductive lines, a distance between two conductive lines that are adjacent and do not intersect is greater than or equal to a maximum width of any conductive line, and is less than or equal to a minimum width of any feed line.

In some embodiments, the antenna is configured to transmit a radio frequency signal. The distance between the two conductive lines that are adjacent and do not intersect is less than or equal to ⅕ of a wavelength of the radio frequency signal.

In some embodiments, the antenna is configured to transmit a radio frequency signal. The distance between the two conductive lines that are adjacent and do not intersect is greater than or equal to ⅒ of a wavelength of the radio frequency signal.

In some embodiments, the first feed line includes a plurality of first conductive lines with substantially parallel extending directions and a plurality of second conductive lines with substantially parallel extending directions, and the plurality of first conductive lines and the plurality of second conductive lines constitute the mesh structure. The plurality of first patch units each include a plurality of third conductive lines with substantially parallel extending directions and a plurality of fourth conductive lines with substantially parallel extending directions, and the plurality of third conductive lines and the plurality of fourth conductive lines constitute the mesh structure. A first conductive line, a second conductive line, a third conductive line and a fourth conductive line are each one of the plurality of conductive lines.

In some embodiments, the first conductive line is substantially parallel to the third conductive line, and the second conductive line is substantially parallel to the fourth conductive line.

In some embodiments, the plurality of first patch units are alternately connected in series to the first feed line at two sides thereof, and a first patch unit is non-perpendicular to the first feed line.

In some embodiments, the at least one feed line further includes a second feed line. The antenna further includes a plurality of second patch units, a second patch unit is perpendicular to a first patch unit, and the plurality of second patch units are serially connected to the second feed line in an extending direction of the second feed line. The second feed line and the plurality of second patch units each have a mesh structure.

In some embodiments, the antenna further includes at least one impedance matching unit, and an impedance matching unit is coupled to a feed line. The at least one impedance matching unit has a mesh structure.

In some embodiments, the impedance matching unit is connected to an end portion of the feed line.

In some embodiments, the impedance matching unit is in a shape of a regular polygon. A whole of the impedance matching unit and the feed line that are connected is in a shape of an axisymmetric pattern.

In some embodiments, the impedance matching unit has a groove, the end portion of the feed line proximate to the impedance matching unit is connected to a bottom of the groove, and the feed line and each of two sidewalls of the groove have a gap therebetween everywhere.

In some embodiments, a distance between the two sidewalls of the groove is 1.4 to 1.8 times a width of the feed line; and a depth of the groove is 0.5 times to 2.25 times the width of the feed line.

In another aspect, a display device having a light exit surface is provided. The display device includes a dielectric layer, a pixel circuit layer, and an antenna layer. The pixel circuit layer is located on a side of the dielectric layer away from the light exit surface. The antenna layer is located on a surface of the dielectric layer proximate to the light exit surface, the antenna layer includes at least one antenna array, and an antenna array is configured to transmit a radio frequency signal. The antenna array includes a plurality of antennas each as described in any of the above embodiments, and the plurality of antennas in the antenna array are arranged sequentially in a direction perpendicular to a thickness direction of the display device.

In some embodiments, the at least one antenna array includes a plurality of antenna arrays, the plurality of antenna arrays are arranged sequentially in the direction perpendicular to the thickness direction of the display device, and a distance between any two adjacent antenna arrays is in a range of ¼ to ¾ of a wavelength of the radio frequency signal.

In some embodiments, the display device further includes a direction adjusting unit coupled to the antenna array, and the direction adjusting unit is configured to adjust a direction of the radio frequency signal transmitted by the antenna array.

In some embodiments, the direction adjusting unit includes transmission lines arranged in a form of Butler matrix. The Butler matrix includes a plurality of input ports and a plurality of output ports, an output port is coupled to an antenna in the antenna array, the output port also communicates with the plurality of input ports of the Butler matrix, and the output port and each input port have a different connection path.

In some embodiments, the display device further includes a dummy pattern disposed in a same layer as the antenna layer. The dummy pattern and the antenna layer have a gap therebetween everywhere. The dummy pattern has a mesh structure.

In some embodiments, the dummy pattern includes a plurality of first traces with substantially parallel extending directions and a plurality of second traces with substantially parallel extending directions, the plurality of first traces and the plurality of second traces constitute the mesh structure. A distance between any two adjacent first traces is greater than or equal to 1/10 of a wavelength of the radio frequency signal, and is less than or equal to 1/5 of the wavelength of the radio frequency signal. A distance between any two adjacent second traces is greater than or equal to 1/10 of the wavelength of the radio frequency signal, and is less than or equal to 1/5 of the wavelength of the radio frequency signal.

In some embodiments, a first trace includes a plurality of first trace segments, a length of a first trace segment is less than or equal to 1/2 of the wavelength of the radio frequency signal. A distance between any two first trace segments that are adjacent and located in a same line is in a range of 5 times to 20 times a width of the first trace. A second trace includes a plurality of second trace segments, a length of a second trace segment is less than or equal to 1/2 of the wavelength of the radio frequency signal. A distance between any two second trace segments that are adjacent and located in a same line is in a range of 5 times to 20 times a width of the second trace.

In some embodiments, a distance between the dummy pattern and the antenna layer is in a range of 10 times to 30 times a width of a first trace.

BRIEF DESCRIPTION OF THE DRAWINGS

In order to describe technical solutions in the present disclosure more clearly, accompanying drawings to be used in some embodiments of the present disclosure will be introduced briefly below. Obviously, the accompanying drawings to be described below are merely accompanying drawings of some embodiments of the present disclosure, and a person of ordinary skill in the art may obtain other drawings according to these drawings. In addition, the accompanying drawings to be described below may be regarded as schematic diagrams, but are not limitations on actual sizes of products, actual processes of methods, and actual timings of signals to which the embodiments of the present disclosure relate.

DETAILED DESCRIPTION

Figure 1:
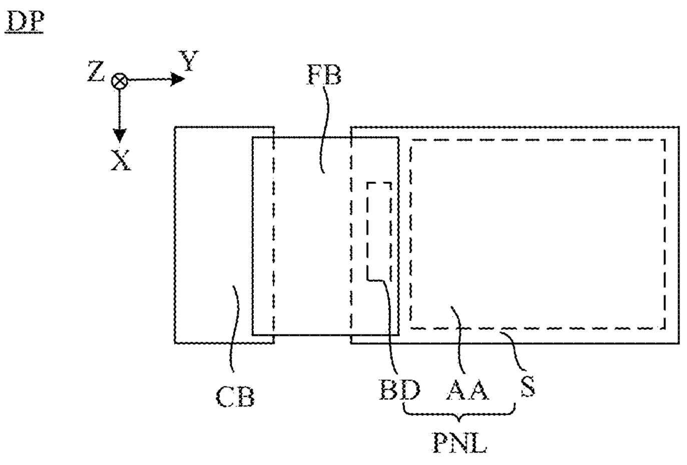
FIG. 1 is a structural diagram of a display device, in accordance with some embodiments.

Technical solutions in some embodiments of the present disclosure will be described clearly and completely with reference to the accompanying drawings below. Obviously, the described embodiments are merely some but not all embodiments of the present disclosure. All other embodiments obtained by a person of ordinary skill in the art based on the embodiments of the present disclosure shall be included in the protection scope of the present disclosure.

Unless the context requires otherwise, throughout the description and the claims, the term “comprise” and other forms thereof such as the third-person singular form “comprises” and the present participle form “comprising” are construed as open and inclusive, i.e., “including, but not limited to”. In the description of the specification, the terms such as “one embodiment”, “some embodiments”, “exemplary embodiments”, “example”, “specific example” or “some examples” are intended to indicate that specific features, structures, materials or characteristics related to the embodiment(s) or example(s) are included in at least one embodiment or example of the present disclosure. Schematic representations of the above terms do not necessarily refer to the same embodiment(s) or example(s). In addition, the specific features, structures, materials or characteristics may be included in any one or more embodiments or examples in any suitable manner.

Hereinafter, the terms such as "first" and "second" are used for descriptive purposes only, but are not to be construed as indicating or implying the relative importance or implicitly indicating the number of indicated technical features. Thus, a feature defined with "first" or "second" may explicitly or implicitly include one or more of the feature. In the description of the embodiments of the present disclosure, the term "a plurality of" or "the plurality of" means two or more unless otherwise specified.

In the description of some embodiments, the expressions "coupled", "connected" and derivatives thereof may be used. For example, the term "connected" may be used in the description of some embodiments to indicate that two or more components are in direct physical or electrical contact with each other. For another example, the term "coupled" may be used in the description of some embodiments to indicate that two or more components are in direct physical or electrical contact. However, the term "coupled" or "communicatively coupled" may also mean that two or more components are not in direct contact with each other, but still cooperate or interact with each other. The embodiments disclosed herein are not necessarily limited to the content herein.

The phrase "at least one of A, B and C" has the same meaning as the phrase "at least one of A, B or C", and they both include following combinations of A, B and C: only A, only B, only C, a combination of A and B, a combination of A and C, a combination of B and C, and a combination of A, B and C.

The phrase "A and/or B" includes the following three combinations: only A, only B, and a combination of A and B.

As used herein, depending on the context, the term "if" is optionally construed as "when", "in a case where", "in response to determining that" or "in response to detecting". Similarly, depending on the context, the phrase "if it is determined" or "if [a stated condition or event] is detected" is optionally construed as "in a case where it is determined", "in response to determining", "in a case where [the stated condition or event] is detected", or "in response to detecting [the stated condition or event]".

The phase "applicable to" or "configured to" as used herein indicates an open and inclusive expression, which does not exclude apparatuses that are applicable to or configured to perform additional tasks or steps.

In addition, the use of the phase "based on" is meant to be open and inclusive, since a process, step, calculation or other action that is "based on" one or more of the stated conditions or values may, in practice, be based on additional conditions or values exceeding those stated.

The term such as "about", "substantially" or "approximately" as used herein includes a stated value and an average value within an acceptable range of deviation of a particular value. The acceptable range of deviation is determined by a person of ordinary skill in the art in consideration of the measurement in question and errors associated with measurement of a particular quantity (i.e., limitations of a measurement system).

The term such as "parallel", "perpendicular" or "equal" as used herein includes a stated condition and a condition similar to the stated condition. A range of the similar condition is within an acceptable range of deviation. The acceptable range of deviation is determined by a person of ordinary skill in the art in consideration of the measurement in question and errors associated with the measurement of a particular quantity (i.e., limitations of the measurement system). For example, the term "parallel" includes absolute parallelism and approximate parallelism, and an acceptable range of deviation of the approximate parallelism may be a deviation within 5°; the term "perpendicular" includes absolute perpendicularity and approximate perpendicularity, and an acceptable range of deviation of the approximate perpendicularity may also be a deviation within 5°; and the term "equal" includes absolute equality and approximate equality, and an acceptable range of deviation of the approximate equality may be a difference between two equals being less than or equal to 5% of either of the two equals.

Exemplary embodiments are described herein with reference to sectional views and/or plan views as idealized exemplary drawings. In the accompanying drawings, thicknesses of layers and sizes of regions are enlarged for clarity. Variations in shapes relative to the accompanying drawings due to, for example, manufacturing technologies and/or tolerances may be envisaged. Therefore, the exemplary embodiments should not be construed to be limited to the shapes of regions shown herein, but to include deviations in the shapes due to, for example, manufacturing. For example, an etched region shown in a rectangular shape generally has a feature of being curved. Therefore, the regions shown in the accompanying drawings are schematic in nature, and their shapes are not intended to show actual shapes of the regions in an apparatus, and are not intended to limit the scope of the exemplary embodiments.

As communication standards (e.g., short-range wireless communication) have entered public use, electronic devices (e.g., display devices for image display) have been equipped with antennas corresponding to different frequency bands and communication schemes for wireless communication in a plurality of frequency bands. In addition, continuous development of the communication technologies also puts an increasing high technical requirement on the antennas. For the electronic device, a transmission rate of the wireless communication is increasingly high, and a capacity of the communications is increasingly high, resulting in an increasingly high carrier frequency and an increasingly high loss of a signal of an antenna. Therefore, an array antenna is required for the reduction of the loss. With the continuous increase of the commercialization degree of electronic devices, the electronic devices are increasingly developing toward a direction of miniaturization and lightweight in order to satisfy a demand of users for convenience. A space for mounting the antenna in the electronic device is very limited. Therefore, a millimeter wave communication with both a short length and a small size of the antenna required for transmission has become a hot topic of the current communication technologies.

Antenna in package (AIP), dielectric resonator antenna (DRA), and the like are commonly used to achieve the communication of the electronic devices. However, the AIP is typically provided in a module of the electronic device, and a main pointing of the AIP is a side of the electronic device facing away from the user (i.e., a back face). The DRA is typically provided at a border of a bezel, a speaker or the like of the electronic device, and a main pointing of the DRA is a side of the electronic device (i.e., a side face). In a case where the back face and the side face of the electronic device are blocked, the antenna provided at a corresponding position has a risk of a transmission interruption. As a result, stability of the signal transmission is poor, which affects user experience.

In order to avoid the above problems, some embodiments of the present disclosure provide a display device. An antenna on display (AOD) technology is applied to the display device, and an antenna is embedded in a display module of the display device on a premise of not affecting normal display. The main pointing of the antenna is a display side (i.e., a side at which the user views), so as to facilitate omnidirectional signal transmission of the display device.

Figure 2:
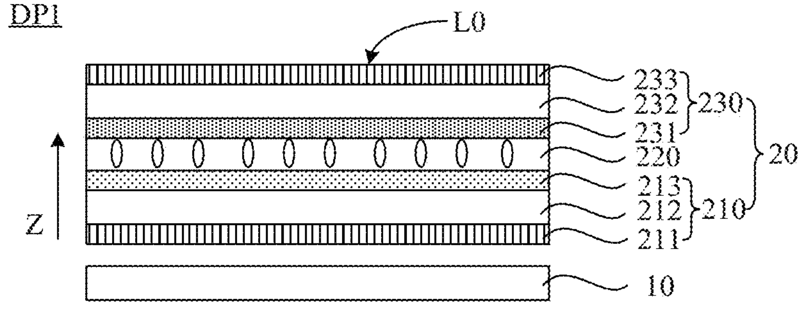
FIG. 2 is a structural diagram of a liquid crystal display device, in accordance with some embodiments.
Figure 3:
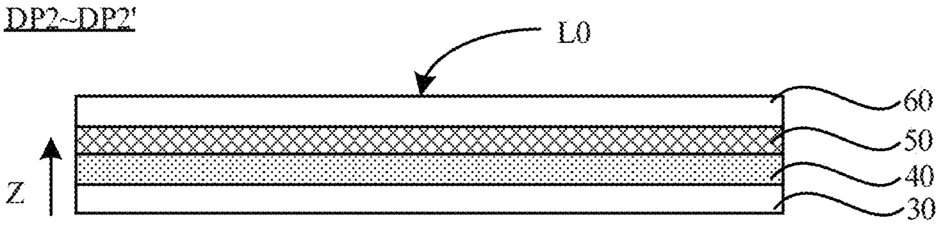
FIG. 3 is a structural diagram of a self-luminous display device, in accordance with some embodiments.

For example, the display device may include, but is not limited to, a mobile phone, a tablet computer (or referred to as a portable computer, a tablet personal computer (PC)), a personal digital assistant (PDA), an ultra-mobile personal computer (UMPC), a netbook and a navigator. Embodiments of the present disclosure do not limit the use of the display device. In addition, the display device may be a rollable or bendable flexible display device, or a flat rigid display device. As shown in FIGS. 2 and 3, the display device has a light exit surface L0. A surface, on which the display device can display an image, that can be seen by the user is the light exit surface of the display device.

The display device includes a display panel, and the display panel is configured to display an image such as a still image or a dynamic image. A type of the display panel is not excessively limited. For example, the display panel may be a liquid crystal display (LCD) panel, or a self-luminous display panel such as an organic light-emitting diode (OLED) display panel, a quantum dot light-emitting diode (QLED) display panel or a tiny light-emitting diode (tiny LED, including mini LED or micro LED) display panel. In a case where the display panel in the display device is the LCD panel, the display device is an LCD device. In a case where the display panel in the display device is the self-luminous display panel, the display device is a self-luminous display device.

Referring to FIG. 1, the display panel PNL has a display area (also referred to as an active area) AA and a peripheral area S. The peripheral region S is located on at least one side of the display area AA. For example, the peripheral area S may be disposed around the display area AA. The display area AA is an area capable of displaying an image. The display panel may further include a plurality of sub-pixels (not shown in the figures), and the plurality of sub-pixels are located in the display area AA. For example, the plurality of sub-pixels may be arranged in an array. The plurality of sub-pixels may include first color sub-pixels configured to emit light of a first color, second color sub-pixels configured to emit light of a second color, and third color sub-pixels configured to emit light of a third color. For example, the first color, the second color and the third color are red, green and blue, respectively.

With continued reference to FIG. 1, the display panel PNL may further have at least one (e.g., one) bonding area BD. A portion of the display panel PNL located in the bonding area BD is used to be electrically connected to an external circuit (a circuit outside the display panel PNL). The display panel PNL may include a plurality of signal input points (e.g., PAD, i.e., bonding pad) disposed in the bonding area BD. The plurality of signal input points may be used to receive signals. The signals provided by these signal input points may control the display panel PNL and display device DP.

For example, the display device may further include a touch layer (also referred to as a touch screen, a touch structure or a touch plate). The touch layer is used to sense a touch position to achieve touch. The embodiments of the present disclosure do not excessively limit a specific arrangement of the touch layer. For example, the touch layer may be arranged in an in-cell manner, an on-cell manner, or a flexible multiple layer on cell (FMLOC) manner.

It can be understood that the display device should include structural components and other films that are necessary to achieve its basic functions, which are not described in details in the embodiments of the present disclosure. Only some key components in the display device will be described in details below, and structural components not described below do not indicates that the components are not provided in the display device.

For example, in a case where the display device is the liquid crystal display device, referring to FIG. 2, in a thickness direction (i.e., the Z direction) of the liquid crystal display device DP1, the liquid crystal display device DP1 includes a backlight module 10 and a liquid crystal display panel 20 that are stacked sequentially. The backlight module 10 is used to provide backlight, and brightness of the backlight passing through the plurality of sub-pixels in the liquid crystal display panel 20 are different under control of the external circuit, thereby achieving the image display. The backlight module 10 may include optical structures such as a light source, a reflector sheet, a light guide plate, a diffusion sheet and a prism sheet.

With continued reference to FIG. 2, in the thickness direction of the liquid crystal display device DP1, the liquid crystal display panel 20 includes an array substrate 210, a liquid crystal layer 220, and a counter substrate 230 (also referred to as an opposite substrate) that are stacked sequentially.

In the thickness direction of the liquid crystal display device DP1, the array substrate 210 includes a first polarizer 211, a first substrate 212 and a pixel circuit layer 213 that are stacked sequentially; and the counter substrate 230 includes a color filter layer 231, a second substrate 232 and a second polarizer 233 that are stacked sequentially. A direction of light passing through the first polarizer 211 may be perpendicular to a direction of light passing through the second polarizer 233.

For example, the first substrate 212 may be a rigid substrate. The rigid substrate may be, for example, a glass substrate or a polymethyl methacrylate (PMMA) substrate. For another example, the substrate may be a flexible substrate. The flexible substrate may be, for example, a polyethylene terephthalate (PET) substrate, a polyethylene naphthalate two formic acid glycol ester (PEN) substrate, a polyimide (PI) substrate or a modified polyimide (MPI) substrate. The second substrate 232 may be made of a same material as the first substrate 212, which is not repeated here.

The pixel circuit layer 213 includes a plurality of gate lines (also referred to as scanning lines), a plurality of data lines and a plurality of pixel circuits (also referred to as pixel driving circuits). The plurality of gate lines are arranged crosswise (e.g., perpendicular) to the plurality of data line. Each pixel circuit includes at least one transistor (e.g., two transistors) and one capacitor. Each pixel circuit corresponds to a sub-pixel, so as to adjust brightness of the sub-pixel corresponding thereto.

The color filter layer 231 includes a plurality of color filters. Each sub-pixel corresponds to a color filter, and a color of the sub-pixel is determined by the color filter corresponding thereto. The color filter layer may further include a black matrix (not shown in the figures), which is used for shading light and avoiding color mixture of sub-pixels of different colors.

For another example, in a case where the display device is the self-luminous display device DP2, referring to FIG. 3, in a thickness direction (i.e., the Z direction) of the self-luminous display device DP2, the self-luminous display panel DP2' includes a substrate 30, a pixel circuit layer 40, a light-emitting layer 50 and an encapsulation layer 60 that are stacked sequentially. The self-luminous display panel DP2' further includes a pixel defining layer (not shown in the figures) disposed on a side of the pixel circuit layer 40 away from the substrate. The pixel defining layer has a plurality of openings, and each opening corresponds to a sub-pixel.

The substrate 30 may have a single-layer structure or a multi-layer structure, and may be a rigid substrate or a flexible substrate. In a case where the substrate 30 has the single-layer structure, the substrate 30 may be made of the same material as the first substrate, which is not repeated here. In a case where the substrate 30 is the multi-layer structure, the substrate may include a third substrate and at least one (e.g., one) barrier layer formed on the third substrate. The barrier layer is located on a side of the third substrate proximate to the pixel circuit layer 40, and a material of the barrier layer may be any one of silicon oxide ($SiO_x$), silicon nitride ($SiN_x$), metal, metal oxide and the like.

The pixel circuit layer 40 of the self-luminous display device DP2 includes a plurality of signal lines. The plurality of signal lines include a plurality of gate lines, a plurality of data lines, and the like. The pixel circuit layer 40 further includes a plurality of pixel circuits, and each pixel circuit corresponds to a sub-pixel. In addition, the plurality of signal lines may further include a plurality of light-emitting control signal lines, reset signal lines, and a plurality of initialization signal lines. The light-emitting control signal line is configured to transmit a light-emitting control signal, the reset signal line is configured to transmit a reset control signal, and the initialization signal line is configured to transmit an initialization signal. A specific structure of the pixel circuit is not limited in the embodiments of the present disclosure, and may be designed according to actual conditions. The pixel circuit is composed of electronic components such as transistor(s) and capacitor(s). For example, the pixel circuit may include two transistors (one switching transistor and one driving transistor) and one capacitor, which constitutes a 2T1C structure. Of course, the pixel circuit may include more than two transistors (a plurality of switching transistors and one driving transistor) and at least one capacitor. For example, the pixel circuit may include one capacitor and seven transistors (six switching transistors and one driving transistor), which constitutes a 7T1C structure.

The light-emitting layer 50 includes a plurality of light-emitting devices, and each light-emitting device corresponds to a sub-pixel. For example, the light-emitting device may include a cathode, an anode, and a light-emitting functional layer located between the cathode and the anode. The light-emitting functional layer may include, for example, an emission layer (EML), a hole transport layer (HTL) located between the emission layer and the anode, and an electron transport layer (ETL) located between the emission layer and the cathode. Of course, as needed, in some embodiments, a hole injection layer (HIL) may be provided between the hole transport layer and the anode, and an electron injection layer (EIL) may be provided between the electron transport layer and the cathode.

For example, the anode of the light-emitting device may be made of a transparent conductive material with a high work function, and the electrode material may include indium tin oxide (ITO), indium zinc oxide (IZO), indium gallium oxide (IGO), gallium zinc oxide (GZO), zinc oxide (ZnO), indium oxide ($In_2O_3$), aluminum zinc oxide (AZO) or carbon nanotube. For example, the cathode of the light-emitting device may be made of a material with a high electrical conductivity and a low work function, and the electrode material may include alloy such as magnesium aluminum (MgAl) alloy or lithium aluminum (LiAl) alloy, or metal elementary substance such as magnesium (Mg), aluminum (Al), lithium (Li) or silver (Ag). A material of the light-emitting functional layer may be selected depending on different light-emitting colors thereof. For example, the material of the light-emitting functional layer includes a fluorescent light-emitting material or a phosphorescent light-emitting material. In at least one embodiment of the present disclosure, the light-emitting functional layer may adopt a doped system, that is, a usable light-emitting material obtained by mixing a doped material into a main light-emitting material. For example, the main light-emitting material may include a metal compound material, a derivative of anthracene, an aromatic diamine compound, a triphenylamine compound, an aromatic triamine compound, a biphenyl diamine derivative, or a triarylamine polymer.

In the self-luminous display device DP2, in order to protect the light-emitting layer 50 against moisture and oxygen and make the light-emitting layer 50 have a long operating life, after the light-emitting layer 50 is formed, the encapsulation layer 60 may be formed on a side of the light-emitting layer away from the substrate. A material of the encapsulation layer 60 may be selected depending on needs, and is not limited. The encapsulation layer may be of a single-layer structure or a multi-layer structure. For example, the encapsulation layer adopts a three-layer sealing structure, and in the thickness direction of the self-luminous display device DP2, the encapsulation layer 60 includes a first inorganic material layer, an organic material layer and a second inorganic material layer that are stacked sequentially.

Figure 4:
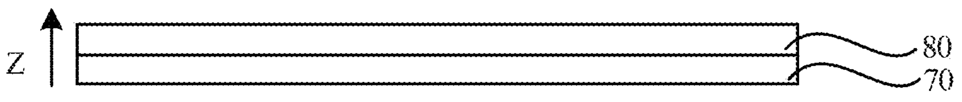
FIG. 4 is a structural diagram of an antenna layer and a dielectric layer, in accordance with some embodiments.

In combination with the foregoing descriptions, referring to FIG. 4, the display device (which is the liquid crystal display device or the self-luminous display device) to which the AOD technology is applied further includes a dielectric layer 70 and an antenna layer 80. The antenna layer 80 is located on a surface of the dielectric layer 70 proximate to the light exit surface of the display device. That is, in the Z direction, the antenna layer 80 is located on the dielectric layer 70, and is in contact with the dielectric layer 70. The antenna layer 80 is made of a conductive material. The conductive material may be, for example, any one of magnesium aluminum (MgAl) alloy, lithium aluminum (LiAl) alloy and other alloys, and magnesium (Mg), aluminum (Al), lithium (Li), silver (Ag), copper (Cu), gold (Au) and other metal elementary substances; or any one or more of indium tin oxide (ITO), indium zinc oxide (IZO), indium gallium oxide (IGO), gallium zinc oxide (GZO), zinc oxide (ZnO), indium oxide ($In_2O_3$), aluminum zinc oxide (AZO), graphene, carbon nanotube and other conductive materials.

The antenna layer 80 includes at least one antenna array 81, and at least one (e.g., each) antenna array 81 is configured to transmit a radio frequency signal. Each antenna array 81 includes a plurality of antennas, and the plurality of antennas in the antenna array 81 are arranged sequentially in a direction perpendicular to the thickness direction of the display device. For example, referring to FIG. 5, the plurality of antennas 810 in the antenna array 81 are arranged sequentially in the X direction. The embodiments of the present disclosure do not limit the number of the antenna arrays 81 in the antenna layer 80 and the number of the antennas 810 in the antenna array 81. As for each antenna array 81, the antenna array 81 may be configured to only send the radio frequency signal, only receive the radio frequency signal, or send and receive (i.e., transmit) the radio frequency signal simultaneously. The radio frequency signal may be any one of decimeter wave, centimeter wave, millimeter wave, and the like. The embodiments of the present disclosure are described by considering an example in which the radio frequency signal is the millimeter wave. Accordingly, the antenna 810 in the antenna layer 80 is a millimeter wave antenna.

Figure 5:
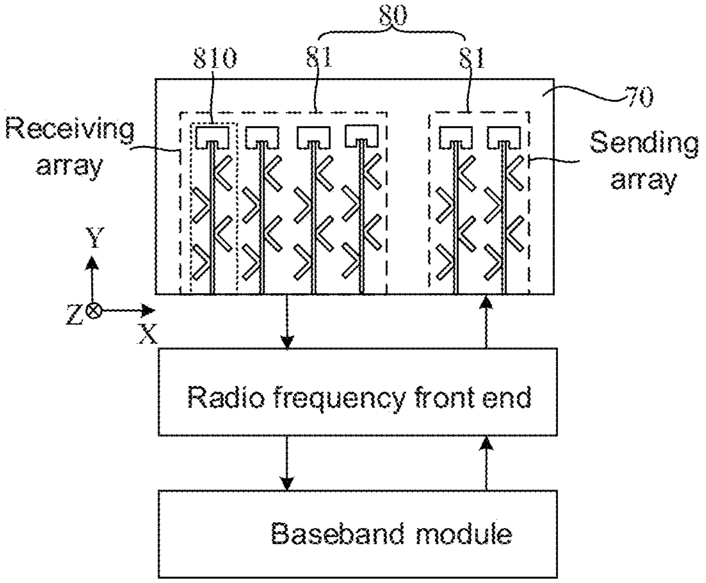
FIG. 5 is a structural diagram of another display device, in accordance with some embodiments.

With continued reference to FIGS. 4 and 5, the dielectric layer 70 may support the antenna layer 80. The dielectric layer 70 is an insulating layer having a flat surface, and the surface of the dielectric layer 70 proximate to the light exit surface of the display device is in contact with the antenna layer 80. For example, the dielectric layer 70 may be located on a side of the pixel circuit layer proximate to the light exit surface of the display device, and accordingly, the antenna layer 80 is also located on the side of the pixel circuit layer proximate to the light exit surface of the display device. In this case, the main pointing of the antenna in the antenna layer 80 is the display side, and the plurality of signal lines in the pixel circuit layer are located on a side of the antenna layer 80 away from the light exit surface, so that radiation of the antenna 810 in the antenna layer 80 may not be interfered, which is conducive to improving radiation effect of the antenna 810. In addition, the plurality of signal lines in the pixel circuit layer may provide a reference voltage and constitute a reference ground of the plurality of antennas 810 in the antenna layer 80.

For example, the dielectric layer 70 may be a layer added in the above display device, and need to be formed separately during the manufacturing of the display device. A material of the dielectric layer 70 may be an inorganic insulating material such as glass, silicon oxide, silicon nitride and metal oxide, or an organic insulating material such as epoxy resin, acrylic resin, imide-based resin. A specific position of the dielectric layer 70 in the display device is not excessively limited as long as the dielectric layer 70 is located on the side of the pixel circuit layer proximate to the light exit surface of the display device. For example, referring to FIG. 2, in the case where the display device is the liquid crystal display device DP1, the dielectric layer (not shown in this figure) may be located on a side of the liquid crystal layer 220 proximate to the light exit surface of the liquid crystal display device DP1, or the dielectric layer may be located on a side of the color filter layer 231 proximate to the light exit surface of the liquid crystal display device DP1. For another example, referring to FIG. 3, in the case where the display device is the self-luminous display device, the dielectric layer (not shown in this figure) may be located on the light-emitting layer 50, or the dielectric layer may be located on the encapsulation layer 60.

For another example, a layer in the display device may be further used as the dielectric layer, thereby facilitating to achieve lightness and thinness of the display device while improving communication effect of the display device. For example, referring to FIG. 2, in the case where the display device is the liquid crystal display device DP1, the second substrate 232 may be further used as the dielectric layer. For another example, referring to FIG. 3, in the case where the display device is the self-luminous display device DP2, the encapsulation layer 60 may be further used as the dielectric layer.

For example, referring to FIG. 5, in order to achieve the wireless communication of the display device, the display device further includes a baseband module and a radio frequency front end in addition to the antenna layer 80. The baseband module may include a central processing unit (CPU), a channel encoder, a digital signal processor, a modem, an interface, and the like. The baseband module is configured to process a baseband signal (a raw electrical signal that is not modulated), for example, to code and decode the baseband signal. The baseband module is further used to perform conversion between the baseband signal and the radio frequency signal, for example, convert the baseband signal into the radio frequency signal and send the radio frequency signal to the radio frequency front end, or receive the radio frequency signal transmitted by the radio frequency front end and convert the radio frequency signal into the baseband signal. The radio frequency front end may include a power amplifier (PA), a filter, a switch, a low noise amplifier (LNA), a tuner, and a duplexer or multiplexer. The radio frequency front end is used to send the radio frequency signal to the antenna, or receive the radio frequency signal from the antenna, so as to realize amplification, filtering and other processing of the radio frequency signal.

With continued reference to FIG. 5, some other embodiments of the present disclosure provide an antenna 810. The antenna 810 is disposed in the above display device, and is in contact with a surface of the dielectric layer 70 proximate to the light exit surface of the display device. The antenna 810 is configured to transmit the radio frequency signal.

Figure 6:
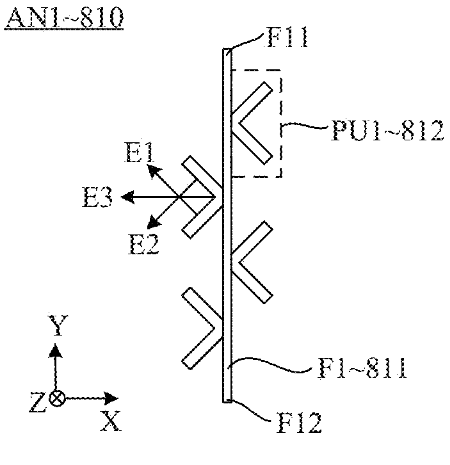
FIG. 6 is a structural diagram of an antenna, in accordance with some embodiments.

For example, referring to FIG. 6, the antenna 810 includes at least one feed line 811 (e.g., one or more feed lines 811) and a plurality of patch units 812. In a case where the antenna 810 includes a plurality of feed lines 811, the plurality of feed lines 811 include at least one (e.g., one) first feed line F1. The plurality of patch units 812 include a plurality of first patch units PU1, and the plurality of first patch units PU1 are serially connected to the first feed line F1 in an extending direction of the first feed line F1, so as to constitute a first antenna AN1. The above antenna includes the first antenna AN1. The first antenna AN1 formed through the arrangement is a series-fed antenna. The first feed line F1 has a first end portion F11 and a second end portion F12 that are opposite. The second end portion F12 needs to be fixedly connected to other conductive structures (i.e., in contact with other conductive structures), so as to be coupled to the radio frequency front end. As a result, the radio frequency signal from the radio frequency front end is able to be transmitted to the antenna 810 for sending, and/or the radio frequency signal received by the antenna 810 is able to be processed by the radio frequency front end and then transmitted to the baseband module finally. The first end portion F11 may remain independent, and is not in contact with other conductive structures. In this way, a standing wave series-fed antenna may be formed.

The plurality of first patch units PU1 may be serially connected to the first feed line F1 in various manners, which is not excessively limited in the embodiments of the present disclosure. For example, the plurality of first patch units PU1 may be located on a same side of the first feed line F1, and arranged sequentially in the extending direction of the first feed line F1. For another example, referring to FIG. 6, the plurality of first patch units PU1 may be sequentially connected to the first feed line F1 in an intersecting manner in the extending direction of the first feed line F1. That is, at least one first patch unit (e.g., multiple first patch units) in the plurality of first patch units PU1 is located on one side of the first feed line F1, and remaining first patch units PU1 are located on the other side of the first feed line F1. In first patch units PU1 located on the same side of the first feed line F1, any two adjacent first patch units PU1 are not in contact. In addition, the number of the plurality of first patch units PU1 connected to a first feed line F1, and the shape of the first patch unit PU1 may be designed depending on a radiation type of the series-fed antenna, which is not limited in the embodiments of the present disclosure. As an example, the number of the first patch units PU1 connected to each first feed line F1 is not less than three, and the shape of the first patch unit PU1 may be any one of a rectangle, a square, a triangle, a circle, an oval, a ring, a sector, a rhombus, a blade shape, a V-shape, a C-shape, a W-shape and the like.

The antenna provided by the embodiments of the present disclosure adopts the series feed mode by which the plurality of patch units are connected to the feed line for feed. As a result, instead of providing an additional power division feed network, the second end of the antenna may directly feed the power to all the patch units in the antenna, thereby effectively reducing loss of the transmission of the radio frequency signal. In addition, the antenna has a large radiation aperture due to the provision of the plurality of patch units, thereby facilitating an increase in radiation efficiency of the antenna. Moreover, compared with other antennas with a non-series-fed structure, the antenna provided by the embodiments of the present disclosure may avoid effect of a bezel (especially a metal bezel) of a terminal (such as the display device) in design. Since the antenna with the non-series-fed structure is generally disposed proximate to the bezel of the terminal, the bonding area can only be provided proximate to the bezel. As a result, the bonding area and the bezel may have a certain effect on the antenna with the non-series-fed structure, which may cause a frequency offset or pattern distortion. However, the antenna provided by the embodiments of the present disclosure adopts the series feed mode. As long as the radiation gain is greater than loss caused by the extension of the path, the antenna may generate a high gain, and an effective radiation area of the antenna provided by the embodiments of the present disclosure is greater than an effective radiation area of the antenna with the non-series-fed structure. Thus, the antenna provided by the embodiments of the present disclosure may avoid the effect of the bonding area and the bezel on the radiation, may be insensitive to the bonding area and the bezel structure, and may be applied to different terminal platforms.

FIG. 6 is a schematic diagram of polarization directions of a first antenna AN1 provided by embodiments of the present disclosure. Referring to FIG. 6, the first patch unit PU1 has a V-shape, and the plurality of first patch units PU1 are sequentially connected to the first feed line F1 in the intersecting manner. Two branches of a first patch unit PU1 on a left side of the first feed line F1 in the figure have respective polarization directions "E1" and "E2", and the polarization directions "E1" and "E2" has a vector sum "E3". Polarization directions of a first patch unit PU1 on a right side of the first feed line F1 in the figure is similar to that of the first patch unit PU1 on the left side of the first feed line F1 in the figure. Therefore, a polarization direction of the entire first antenna AN1 is a horizontal direction.

Figure 7:
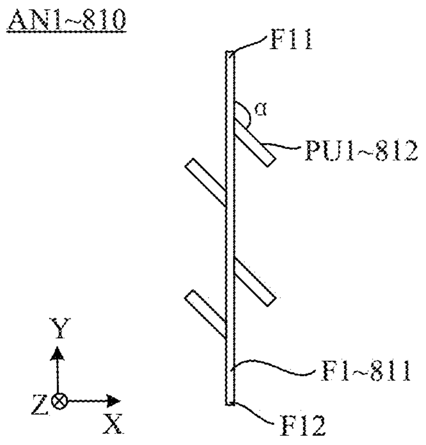
FIG. 7 is a structural diagram of another antenna, in accordance with some embodiments.
Figure 8:
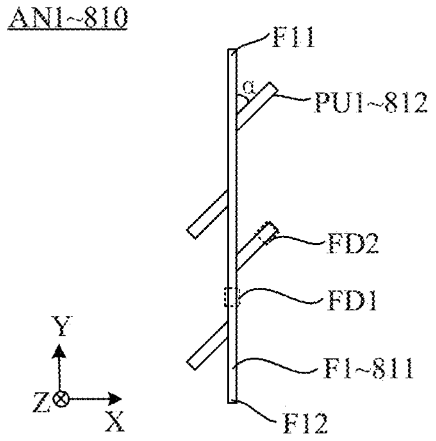
FIG. 8 is a structural diagram of yet another antenna, in accordance with some embodiments.

For example, referring to FIGS. 7 and 8, the first patch units PU1 each have a rectangle, the plurality of first patch units PU1 are alternately connected in series to the first feed line at two sides thereof, and at least one (e.g., each) first patch unit PU1 is non-perpendicular to the first feed line F1. That is, an included angle $\alpha$ between the at least one (e.g., each) first patch unit PU1 and the first feed line F1 is an acute angle or an obtuse angle. For example, referring to FIG. 7, the included angle $\alpha$ between the first patch unit PU1 and the first feed line F1 is the obtuse angle, and the included angle $\alpha$ is approximately 135°. For another example, referring to FIG. 8, the included angle $\alpha$ between the first patch unit PU1 and the first feed line F1 is the acute angle, and the included angle $\alpha$ is approximately 45°. In a case where the included angle $\alpha$ is approximately 45° or approximately 135°, radio frequency signals transmitted by the first patch units PU1 located on both sides of the first feed line F1 are orthogonal to each other, thereby eliminating interference between the radio frequency signals transmitted by the first patch units PU1 and achieving good radiation effect. In addition, the first antenna AN1 shown in FIG. 7 can achieve +45° polarization, and the first antenna AN1 shown in FIG. 8 can achieve −45° polarization. When the antenna 810 shown in any of FIGS. 7 and 8 is used to transmit the radio frequency signal, the radio frequency signal adapted for transmission may not be limited to a horizontal polarization signal or a vertical polarization signal, which has a wide range of applications and strong practicability.

The foregoing descriptions only have a limitation that the antenna layer and the dielectric layer need to be disposed on the side of the pixel circuit layer proximate to the light exit surface of the display device. In some embodiments, the antenna layer may be disposed on a side of the light-emitting layer away from the pixel circuit layer. Thus, for example, referring to FIGS. 8 and 9, the antenna layer may have a mesh structure. For example, at least one (e.g., each) first feed line F1 and/or the plurality of first patch units PU1 may have the mesh structure. For example, only each first feed line F1 in the antenna 810 may be provided to have the mesh structure, only the plurality of first patch units PU1 in the antenna 810 may be provided to have the mesh structure, or each first feed line F1 and the plurality of first patch units PU1 in the antenna 810 may be provided to have the mesh structure. Compared with a conductive pattern having a solid shape filled with conductive material, at least a portion of the antenna layer is provided to have the mesh structure, so that the antenna layer may have a high transmittance (also referred to as light transmittance). As a result, the communication effect of the display device may be improved, and the display effect of the display device may be ensured. In addition, compared with the conductive pattern having the solid shape filled with the conductive material, the mesh structure requires a small total amount of conductive material, and accordingly, the conductive material has a small total weight. Thus, in a case where the antenna having the mesh structure is applied to the display device, it is further conducive to achieving lightness and thinness of the display device. The mesh structure has a plurality of meshes, and the embodiments of the present disclosure do not excessively limit a specific shape of the mesh. For example, the shape of the mesh may be any of a sector, a circle, an arbitrary polygon, a regular polygon and the like.

Figure 9:
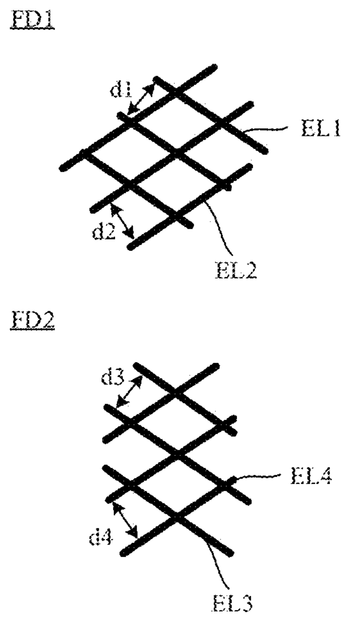
FIG. 9 is enlarged views of both a region FD1 and a region FD2 in FIG. 8.

For example, with continued reference to FIGS. 8 and 9, the mesh structure is comprised of a plurality of conductive lines. Of the plurality of conductive lines, a distance between at least two (e.g., any two) conductive lines that are adjacent and do not intersect is greater than or equal to a maximum width of any conductive line, and is less than or equal to a minimum width of any feed line 811. Ideally, each portion of the conductive line has an equal width. However, each portion of the conductive line that is actually formed does not always have the equal width everywhere in view of deviation of the actual process. A width of a portion of the conductive line may be greater than a preset width, or a width of a portion of the conductive line may be less than the preset width, and it is acceptable as long as a value of the width is within a process error range. The value of the width of the feed line 811 is related to the shape of the feed line 811. In a case where the feed line 811 is in the shape of a straight strip, each portion of the feed line 811 has the approximately equal width. In a case where the feed line 811 is in the shape of a broken line or other non-straight strip, there may be a difference in widths of portions of the feed line 811. The widths of the conductive line and the feed line 811 are each a distance between two opposite edges of a respective profile thereof. In this case, the distance between any two conductive lines that are adjacent and do not intersect is greater than or equal to the maximum width of any conductive line in the plurality of conductive lines, which may ensure that the antenna formed by the conductive lines has the mesh structure and achieve the high transmittance. In addition, the distance between any two conductive lines that are adjacent and do not intersect is less than or equal to the minimum width of any feed line 811, which may ensure that the mesh structure includes the conductive lines with a certain density, and avoid an excessively small effective area (i.e., effective aperture) of the antenna 810 with the mesh structure, so as to ensure the radiation effect of the antenna 810. Moreover, the above arrangement makes the distance between the two conductive lines that are adjacent and do not intersect be within a reasonable range, which is conducive to reducing manufacturing process difficulty, improving yield and reducing cost.

For example, referring to FIGS. 8 and 9, the first feed line F1 and the plurality of first patch units PU1 in the antenna 810 each have the mesh structure, and the at least one (e.g., each) first feed line F1 includes a plurality of first conductive lines EL1 with substantially parallel extending directions and a plurality of second conductive lines EL2 with substantially parallel extending directions. The plurality of first conductive lines EL1 and the plurality of second conductive lines EL2 form the mesh structure. The plurality of first patch units PU1 each include a plurality of third conductive lines EL3 with substantially parallel extending directions and a plurality of fourth conductive lines EL4 with substantially parallel extending directions. The plurality of third conductive lines EL3 and the plurality of fourth conductive lines EL4 form the mesh structure. Each first conductive line EL1, each second conductive line EL2, each third conductive line EL3, and each fourth conductive line EL4 are each one of the plurality of conductive lines described above. The plurality of first conductive lines EL1 intersect the plurality of second conductive lines EL2, and the plurality of third conductive lines EL3 intersect the plurality of fourth conductive lines EL4. The mesh structure of the first feed line F1 and the mesh structure of the first patch unit PU1 may be the same or different. In a case where the mesh structure of the first feed line F1 is different from the mesh structure of the first patch unit PU1, any third conductive line EL3 intersects any first conductive line EL1 and any second conductive line EL2, and the fourth conductive line EL4 is provided in a similar way as the third conductive line EL3. In a case where the mesh structure of the first feed line F1 is the same as the mesh structure of the first patch unit PU1, referring to FIGS. 8 and 9, any first conductive line EL1 is substantially parallel to any third conductive line EL3, and any second conductive line EL2 is substantially parallel to any fourth conductive line EL4. As a result, it is conducive to simplifying design of the mesh structure of the antenna layer, reducing manufacturing difficulty, and optimizing manufacturing cost.

In order to ensure the display effect of the display device, the transmittance of the antenna layer is required to be not less than 86%. In order to ensure that the transmittance of the antenna layer satisfies the above requirement, there should be a reasonable range of the distance between the conductive lines that form the mesh structure of the antenna layer. Thus, for example, referring to FIG. 9, the distance between the two conductive lines that are adjacent and do not intersect is greater than or equal to 1/10 of a wavelength of the radio frequency signal. For example, a distance d1 between any two adjacent first conductive lines EL1 is greater than or equal to 1/10 of the wavelength of the radio frequency signal; a distance d2 between any two adjacent second conductive lines EL2 is greater than or equal to 1/10 of the wavelength of the radio frequency signal; a distance d3 between any two adjacent third conductive lines EL3 is greater than or equal to 1/10 of the wavelength of the radio frequency signal; and a distance d4 between any two adjacent fourth conductive lines EL4 is greater than or equal to 1/10 of the wavelength of the radio frequency signal.

On a premise of ensuring the display effect of the display device, in order to avoid the excessively small effective area (i.e., effective aperture) of the antenna with the mesh structure, the distance between the conductive lines constituting the mesh structure of the antenna layer is required to be not too large, so as to ensure the radiation effect of the antenna. Thus, for example, referring to FIG. 9, the distance between the two conductive lines that are adjacent and do not intersect is less than or equal to 1/5 of the wavelength of the radio frequency signal. For example, the distance d1 between any two adjacent first conductive lines EL1 is less than or equal to 1/5 of the wavelength of the radio frequency signal; the distance d2 between any two adjacent second conductive lines EL2 is less than or equal to 1/5 of the wavelength of the radio frequency signal; the distance d3 between any two adjacent third conductive lines EL3 is less than or equal to 1/5 of the wavelength of the radio frequency signal; and the distance d4 between any two adjacent fourth conductive lines EL4 is less than or equal to 1/5 of the wavelength of the radio frequency signal. In addition, in a case where the radio frequency signal is a millimeter wave, the distance between the conductive lines that satisfies the above requirements is less than or equal to 250 microns, which is much less than a human eye resolution. Therefore, the user does not observe the mesh pattern of the antenna layer, and thus a risk of poor display such as moire pattern may be reduced. For example, the distance between any two adjacent fourth conductive lines EL4 (or one of any two adjacent the first conductive lines EL1, any two adjacent the second conductive lines EL2 and any two adjacent the third conductive lines EL3) is any one of 0.11 times, 0.13 times, 0.15 times, 0.18 times, 0.2 times and the like the wavelength of the radio frequency signal.

Figure 10:
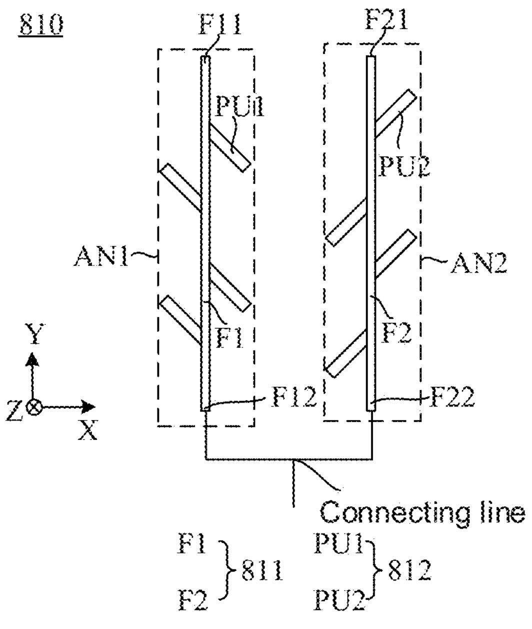
FIG. 10 is a structural diagram of an antenna including a first antenna and a second antenna, in accordance with some embodiments.

For example, referring to FIG. 10, in a case where the antenna 810 includes a plurality of feed lines 811, the plurality of feed lines 811 in the antenna 810 further include at least one (e.g., one) second feed line F2. The plurality of patch units further include a plurality of second patch units PU2. At least one (e.g., each) second patch unit PU2 is perpendicular to any first patch unit PU1. The plurality of second patch units PU2 is serially connected to the second feed line F2 in an extending direction of the second feed line F2, so as to constitute a second antenna AN2. The above antenna 810 further includes the second antenna AN2, and the second antenna AN2 is also a series-fed antenna. The second feed line F2 has a third end portion F21 and a fourth end portion F22 that are opposite. The fourth end portion F22 needs to be fixedly connected to other conductive structures, and the third end portion F21 may remain independent. The third end portion F21 is provided proximate to the first end portion F11, and the fourth end portion F22 is provided proximate to the second end portion F12. Similar to the first antenna AN1, the plurality of second patch units PU2 may be serially connected to the second feed line F2 in various manners. For example, the plurality of second patch units PU2 may be located on a same side of the second feed line F2, and arranged sequentially in the extending direction of the second feed line F2. For another example, referring to FIG. 10, the plurality of second patch units PU2 may be sequentially connected to the second feed line F2 in the intersecting manner in the extending direction of the second feed line F2.

A connection relationship between the first antenna AN1 and the second antenna AN2 in the antenna 810 is not excessively limited. For example, referring to FIG. 10, the first antenna AN1 and the second antenna AN2 in the antenna 810 may be coupled to each other. For example, referring to FIG. 10, the first antenna AN1 and the second antenna AN2 may be coupled through an added connecting line or other manner. For another example, the first antenna AN1 and the second antenna AN2 in the antenna 810 may be separate from each other, not in contact with each other, and not electrically connected. No matter which arrangement described above is adopted, the first patch unit PU1 is perpendicular to the second patch unit PU2, and thus the polarization direction of the first patch unit PU1 is also perpendicular to a polarization direction of the second patch unit PU2. Accordingly, the polarization direction of the entire first antenna AN1 is perpendicular to a polarization direction of the entire second antenna AN2, and the formed antenna 810 is a dual-polarized antenna. It can be understood that the dual-polarized antenna may reduce an influence of multipath fading in the signal transmission process through polarization diversity, which is conducive to improving quality of transmission signals and realizing good transmission effect.

Figure 11:
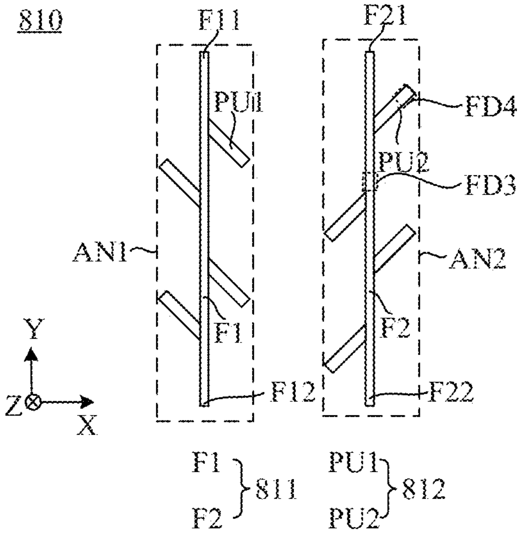
FIG. 11 is a structural diagram of an antenna including a first antenna and a second antenna, in accordance with further embodiments.
Figure 12:
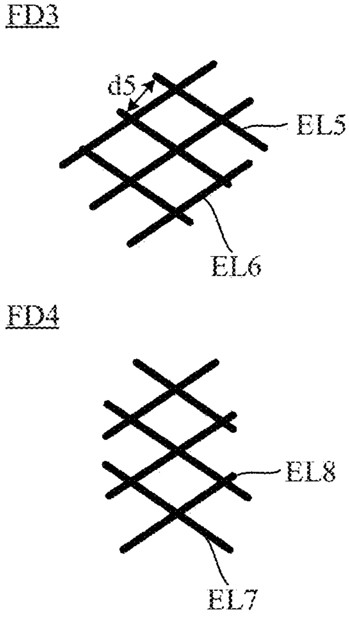
FIG. 12 is enlarged views of both a region FD3 and a region FD4 in FIG. 11.

Similar to the first antenna AN1, referring to FIGS. 11 and 12, at least one (e.g., each) second feed line F2 and/or the plurality of second patch units PU2 may have a mesh structure. For example, only each second feed line F2 in the antenna 810 may be provided to have the mesh structure, only the plurality of second patch units PU2 in the antenna 810 may be provided to have the mesh structure, or as shown in FIG. 12, each second feed line F2 and the plurality of second patch units PU2 in the antenna 810 may be provided to have the mesh structure. Similar to the foregoing descriptions, the mesh structure is comprised of a plurality of conductive lines. Of the plurality of conductive lines, a distance between at least two (e.g., any two) conductive lines that are adjacent and do not intersect is greater than or equal to a maximum width of any conductive line, and is less than or equal to a minimum width of any feed line 811. For example, at least one (e.g., each) second feed line F2 includes a plurality of fifth conductive lines EL5 with substantially parallel extending directions and a plurality of sixth conductive lines EL6 with substantially parallel extending directions. The plurality of fifth conductive lines EL5 and the plurality of sixth conductive lines EL6 form the mesh structure. The plurality of second patch units PU2 each include a plurality of seventh conductive lines EL7 with substantially parallel extending directions and a plurality of eighth conductive lines EL8 with substantially parallel extending directions. The plurality of seventh conductive lines EL7 and the plurality of eighth conductive lines EL8 form the mesh structure. Each fifth conductive line EL5, each sixth conductive line EL6, each seventh conductive line EL7 and each eighth conductive line EL8 are each one of the plurality of conductive lines described above. The plurality of fifth conductive lines EL5 intersect the plurality of sixth conductive lines EL6, and the plurality of seventh conductive lines EL7 intersect the plurality of eighth conductive lines EL8. The mesh structure of the second feed line F2 and the mesh structure of the second patch unit PU2 may be the same. Any fifth conductive line EL5 is substantially parallel to any seventh conductive line EL7, and any sixth conductive line EL6 is substantially parallel to any eighth conductive line EL8. The mesh structure of the first antenna AN1 is the same as the mesh structure of the second antenna AN2. Any first conductive line is substantially parallel to any fifth conductive line EL5, and any second conductive line is substantially parallel to any sixth conductive line EL6. In addition, a distance between any two adjacent conductive lines of a same type is greater than or equal to 1/10 of the wavelength of the radio frequency signal, and less than or equal to 1/5 of the wavelength of the radio frequency signal. For example, a distance d5 between any two adjacent fifth conductive lines EL5 is greater than or equal to 1/10 of the wavelength of the radio frequency signal, and less than or equal to 1/5 of the wavelength of the radio frequency signal. The sixth conductive lines EL6, the seventh conductive lines EL7 and the eighth conductive lines EL8 are arranged in a similar manner, which is not repeated here.

Figure 13:
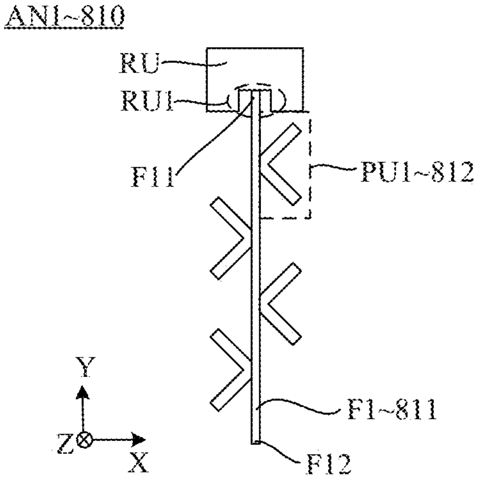
FIG. 13 is a structural diagram of an antenna including an impedance matching unit, in accordance with some embodiments.
Figure 14:
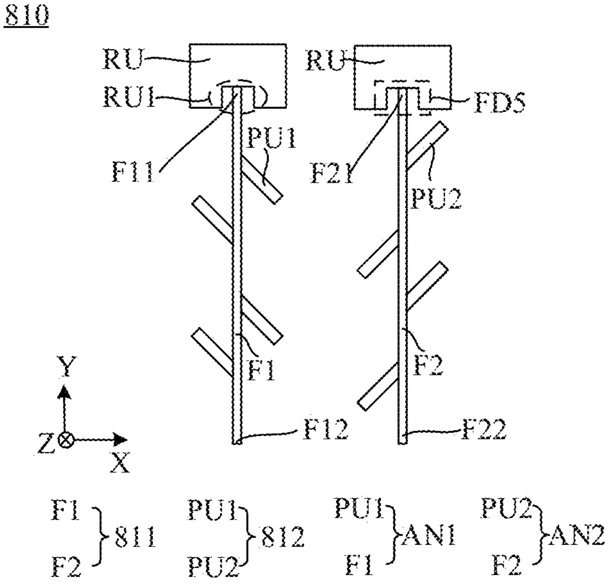
FIG. 14 is a structural diagram of another antenna including impedance matching units, in accordance with some embodiments.
Figure 15:
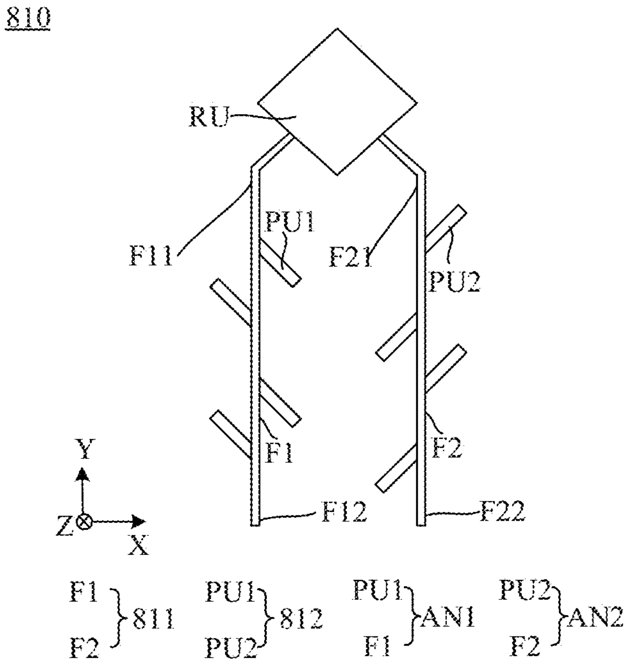
FIG. 15 is a structural diagram of yet another antenna including an impedance matching unit, in accordance with some embodiments.

For example, referring to FIGS. 13, 14 and 15, the antenna 810 may further include at least one impedance matching unit RU (e.g., one or two impedance matching units RU). Each impedance matching unit RU is coupled to at least one feed line 811 (e.g., one or two feed lines 811), and the antenna 810 provided with the impedance matching unit RU is a traveling wave series-fed antenna. The impedance matching unit RU is configured to adjust impedance, so that input impedance of the antenna 810 is equal to characteristic impedance of the feed line, thereby achieving high efficient transmission of the radio frequency signal. A specific manner of the impedance matching unit RU being coupled to the feed line 811 is not excessively limited. For example, the impedance matching unit RU may be not in contact with the feed line, and a conductive structure connected to both the impedance matching unit RU and the feed line 811 is disposed between the impedance matching unit RU and the feed line 811, so as to achieve the coupling. For another example, the impedance matching unit RU may be directly coupled to the feed line 811. In this case, the impedance matching unit RU may be coupled to any portion of the feed line. The embodiments of the present disclosure do not excessively limit a specific shape of the impedance matching unit RU. For example, the shape of the impedance matching unit RU may be any one of a rectangle, a square, a rhombus, a circle, a triangle and any other shapes.

As described above, in order to ensure the transmission effect of the antenna 810 and the display effect of the display device simultaneously, in a case where the antenna 810 further includes the impedance matching unit RU, the impedance matching unit RU may also have a mesh structure. It can be understood that in a case where the mesh structures of the first antenna AN1, the second antenna AN2 and the impedance matching unit RU in the antenna 810 are different from one another, visualization risks of the above structures are also different accordingly, and a lot of influence factors need to be considered in the design of the antenna. Therefore, in order to reduce the visualization risks and reduce the influence factors of the design, the mesh structures of the first antenna AN1, the second antenna AN2 and the impedance matching unit RU in the antenna 810 may be substantially the same, thereby facilitating achievement of the good display effect. In this case, the impedance matching unit RU may also include a plurality of conductive lines, and the arrangement of the plurality of conductive lines forming the mesh structure is the same as the arrangement of the first antenna AN1 and the second antenna AN2, which is not repeated here.

In order to ensure reasonable radiation efficiency and simplify design, for example, the impedance matching unit RU may be connected to an end portion of the feed line 811, and the end portion is an end portion of the feed line 811 that is not connected to other conductive structures in addition to a structure of the antenna 810. For example, referring to FIG. 13, in a case where the antenna 810 only includes the first antenna AN1, the impedance matching unit RU may be connected to the first feed line F1 such as the first end portion of the first feed line F1. For another example, referring to FIG. 14, in a case where the antenna 810 includes the second antenna AN2, the impedance matching unit RU may be connected to the second feed line F2 such as the third end portion of the second feed line F2. For yet another example, referring to FIG. 15, the antenna 810 includes the first antenna AN1 and the second antenna AN2, and the impedance matching unit RU may be connected to both the first end portion of the first feed line F1 and the third end portion of the second feed line F2, so that the antenna 810 is a co-aperture dual-polarized antenna. The co-aperture dual-polarized antenna can achieve a large radiation aperture in a limited size of the antenna, and thus may be applied in scenes that need high integration.

The impedance matching unit RU has the same mesh structure as the first patch unit PU1 and the second patch unit PU2, and the impedance matching unit RU is also coupled to the first feed line F1 and/or the second feed line F2. Therefore, the impedance matching unit RU may be equivalent to a patch unit. The impedance matching unit RU is capable of transmitting the radio frequency signal as a radiation unit in addition to matching the impedance. The shape of the impedance matching unit RU determines its polarization direction, and the polarization direction of the impedance matching unit RU superposes polarization directions of other structures to determine the polarization direction of the antenna together. Therefore, an irregular shape of the impedance matching unit RU should be avoided. In this way, the polarization direction of the impedance matching unit RU is capable of gaining the polarization directions of other structures in the antenna, so as to improve the polarization effect of the entire antenna, thereby ensuring the transmission effect. For example, referring to FIGS. 13 to 15, the impedance matching unit RU may be provided in a shape of a regular polygon, and a whole of the impedance matching unit RU and the feed line that are connected is in a shape of an axisymmetric pattern.

Further, referring to FIGS. 13 and 14, the impedance matching unit RU has at least one groove RU1 (e.g., one or more grooves RU1). An end portion of the feed line proximate to the impedance matching unit RU is connected to a bottom of the groove RU1, and there is a gap everywhere between the feed line and each of two sidewalls of the groove RU1. In process of transmitting the radio frequency signal, the groove RU1 may prevent the radio frequency signal radiated by the impedance matching unit RU from reflecting back into the feed line 811, thereby ensuring the transmission efficiency. The impedance matching unit RU provided with the groove RU1 is still in a shape of an axisymmetric pattern, and the whole of the feed line 811 (the first feed line F1 and/or the second feed line F2) and the impedance matching unit RU with the groove RU1 that are connected is still in a shape of an axisymmetric pattern. Thus, the polarization effect of the entire antenna 810 may be ensured.

Figure 16:
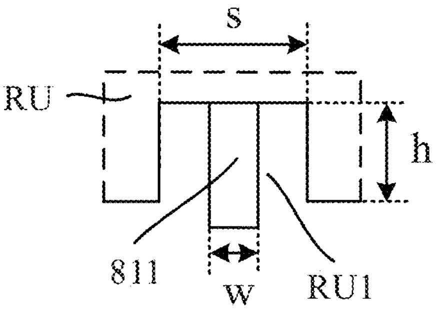
FIG. 16 is an enlarged view of a region FD5 in FIG. 14.

For example, referring to FIG. 16, a distance s between the two sidewalls of the groove RU1 is 1.4 to 1.8 times a width w of the feed line 811, and a depth h of the groove RU1 is 0.5 to 2.25 times the width w of the feed line. For example, the depth h of the groove RU1 is 0.5 to 2.2 times the width w of the feed line. For example, the distance s between the two sidewalls of the groove RU1 may be any one of 1.45, 1.5, 1.54, 1.62, 1.7, 1.75 times the width w of the feed line; and the depth h of the groove RU1 may be any one of 0.6, 0.75, 0.8, 0.9, 1.45, 1.5, 1.65, 1.73, 1.85, 1.9, 2.1 times the width w of the feed line.

The above design parameters of the groove RU1 may achieve a good interference elimination effect, and have a certain general applicability. However, it will be understood that, in a practical application scene, parameters such as shape and size of each structure in the antenna may be optimized according to requirements of a specific application scene, and are not excessively limited in the embodiments of the present disclosure.

Figure 17:
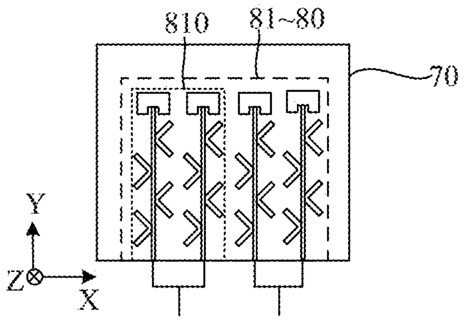
FIG. 17 is a structural diagram of an antenna array, in accordance with some embodiments.
Figure 18:
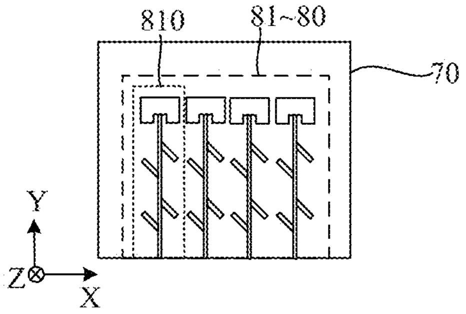
FIG. 18 is a structural diagram of another antenna array, in accordance with some embodiments.
Figure 19:
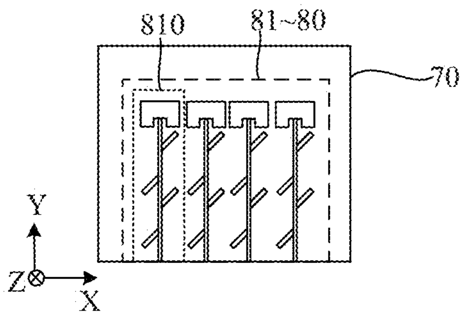
FIG. 19 is a structural diagram of yet another antenna array, in accordance with some embodiments.
Figure 20:
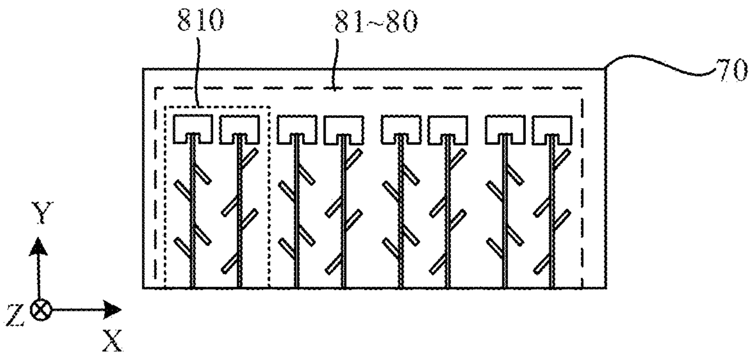
FIG. 20 is a structural diagram of yet another antenna array, in accordance with some embodiments.

In some embodiments of the present disclosure, referring to FIG. 5, the antenna layer 80 of the display device includes a plurality of antenna arrays 81, and each antenna array 81 includes a plurality of antennas 810 as described in any of the above embodiments. The gain and efficiency of the antenna array 81 including the plurality of antennas 810 may be improved compared to those of a single antenna 810. The plurality of antenna arrays 81 includes at least one receiving array (e.g., one or more receiving arrays) and at least one sending array (e.g., one or more sending arrays). The receiving array is configured to receive the radio frequency signal, and the sending array is configured to send the radio frequency signal. The number of antennas included in the receiving array and the number of antennas included in the sending array may be the same or different, which may be set according to actual needs. For example, referring to FIG. 5, the sending array includes two antennas 810, and the receiving array includes four antennas 810. For another example, referring to FIG. 17, the antenna array 81 (the sending array and/or the receiving array) includes two antennas 810. For yet another example, referring to FIGS. 18 to 21, the antenna array 81 (the sending array and/or the receiving array) includes four antennas 810.

For example, in a case where the display device includes the plurality of antenna arrays 81, the plurality of antenna arrays 81 are arranged sequentially in the direction perpendicular to the thickness direction of the display device, and a distance between any two adjacent antenna arrays 81 is in a range of ¼ to ¾ of the wavelength of the radio frequency signal. For example, the distance between any two adjacent antenna arrays 81 is 0.28 times, 0.3 times, 0.45 times, 0.55 times, 0.65 times or 0.7 times the wavelength of the radio frequency signal. The above provision is conducive to reducing interference between radio frequency signals transmitted by two adjacent antenna arrays 81, and may achieve the good transmission effect.

Figure 21:
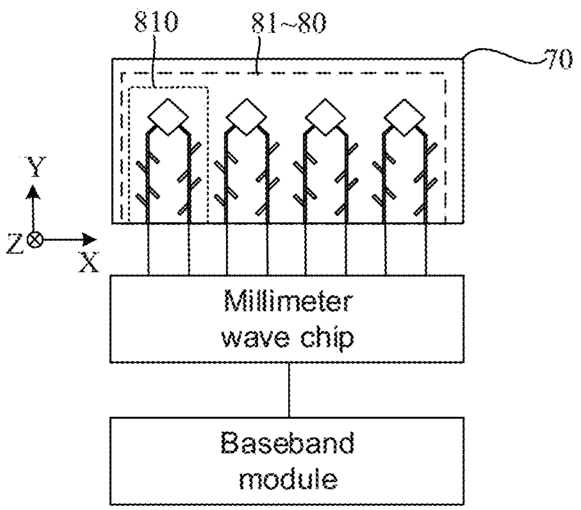
FIG. 21 is a structural diagram of an antenna array and a display device, in accordance with some embodiments.

For example, referring to FIG. 21, the display device includes a millimeter wave chip. The millimeter wave chip is coupled to the baseband module and the antenna array 81. Each antenna 810 in the antenna array 81 is coupled to a respective port of the millimeter wave chip. The millimeter wave chip is an integrated millimeter wave chip, and the chip includes a phase shifter, a power amplifier, a low noise amplifier, a filter and the like.

Figure 22:
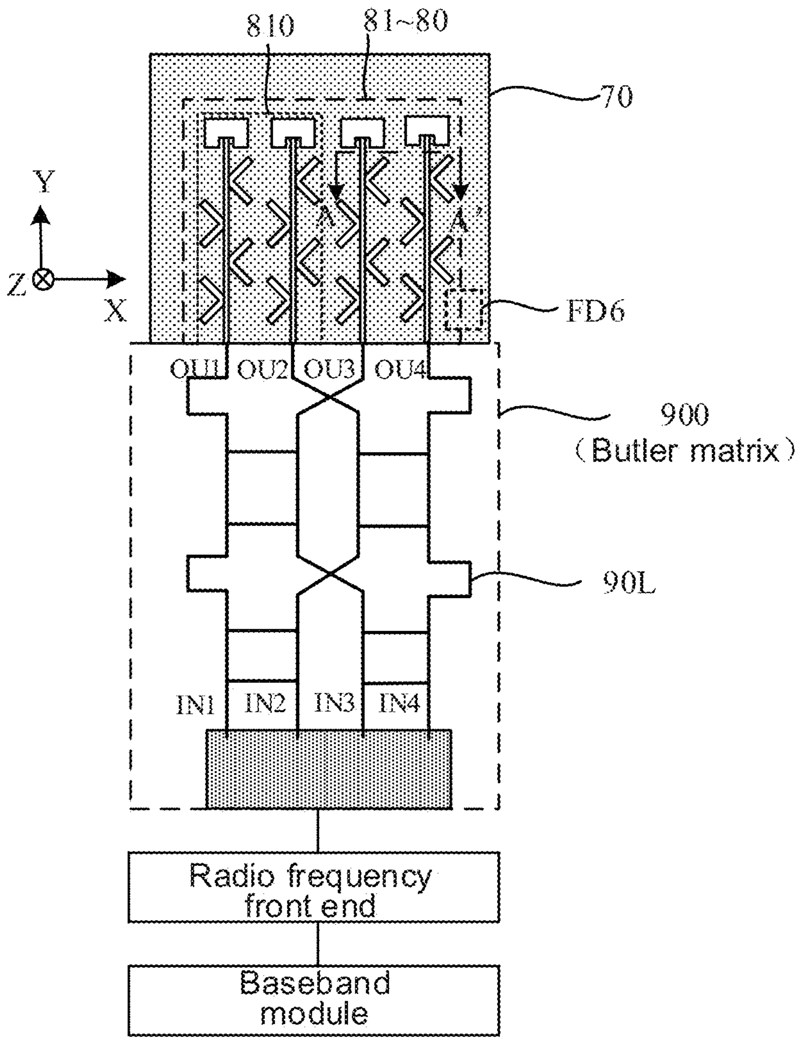
FIG. 22 is another structural diagram of an antenna array and a display device, in accordance with some embodiments.

For example, referring to FIG. 22, the display device further includes a direction adjusting unit 900. Each direction adjusting unit 900 is coupled to at least one (e.g., one) antenna array 81, and the direction adjusting unit is configured to adjust a direction of a radio frequency signal transmitted by an antenna array 81 coupled thereto. Since the direction adjusting unit is capable of adjusting the transmission direction of the radio frequency signal, directivity of the radio frequency signal may be improved, and thus accuracy of the radio frequency signal transmitted by the display device and environment adaptability of the display device may be improved.

For example, referring to FIG. 22, the display device includes the direction adjusting unit, the radio frequency front end and the baseband module. The direction adjusting unit includes transmission lines 90L, and the transmission lines 90L are arranged in a form of Butler matrix. The Butler matrix includes a plurality of input ports and a plurality of output ports, and each output port is coupled to an antenna 810 in the antenna array 81. Each output port also communicates with all input ports of the Butler matrix, and the output port and each input port have a different connection path. The numbers of the input ports and the output ports of the Butler matrix may be set according to needs, and may be the same or different.

With continued reference to FIG. 22, the Butler matrix includes a first input port IN1 to a fourth input port IN4, and a first output port OU1 to a fourth output port OU4. The first input port IN1 may communicates with the first output port OU1, the second output port OU2, the third output port OU3 and the fourth output port OU4. Similarly, the second input port IN2, the third input port IN3 and the fourth input port IN4 may also each communicate with the first output port OU1 to the fourth output port OU4. If the radio frequency signal is input from any one of the first input port IN1 to the fourth input port IN4 (e.g. from the first input port IN1), paths of the radio frequency signal transmitting from the first input port IN1 to the first output port OU1 (i.e., connection path), the second output port OU2, the third output port OU3 and the fourth output port OU4 are different.

For example, referring to the table below, a radio frequency signal input from the first input port IN1 in the Butler matrix is divided into radio frequency sub-signals that are output through the first output port OU1 to the fourth output port OU4, phases of the radio frequency sub-signals are −90°, −135°, −180° and −45°, respectively, and a phase difference between radio frequency sub-signals output by any two adjacent output ports is −45°. A radio frequency signal input from the second input port IN2 in the Butler matrix is divided into radio frequency sub-signals that are output through the first output port OU1 to the fourth output port OU4, phases of the radio frequency sub-signals are −180°, −45°, 90° and 225°, respectively, and a phase difference between radio frequency sub-signals output by any two adjacent output ports is 135°. A radio frequency signal input from the third input port IN3 in the Butler matrix is divided into radio frequency sub-signals 20) that are output through the first output port OU1 to the fourth output port OU4, phases of the radio frequency sub-signals are 225°, 90°, −45° and −180°, respectively, and a phase difference between radio frequency sub-signals output by any two adjacent output ports is −135°. A radio frequency signal input from the fourth input port IN4 in the Butler matrix is divided into radio frequency sub-signals that are output through the first output port OU1 to the fourth output port OU4, phases of the radio frequency sub-signals are −225°, −180°, −135° and −90°,respectively, and a phase difference between radio frequency sub-signals output by any two adjacent output ports is 45°. As can be seen, a radio frequency signal input from a same input port outputs through different output ports to produce radio frequency sub-signals, and the radio frequency sub-signals have different phase delays and amplitudes.

| Phase (°) | OU1 | OU2 | OU3 | OU4 | Phase Difference (°) |
|---|---|---|---|---|---|
| IN1 | −90 | −135 | −180 | −225 | −45 |
| IN2 | −180 | −45 | 90 | 225 | 135 |
| IN3 | 225 | 90 | −45 | −180 | −135 |
| IN4 | −225 | −180 | −135 | −90 | 45 |

After the radio frequency signal is input into the Butler matrix from an input port of the plurality of input ports, the radio frequency signal is divided into multipath radio frequency sub-signals. The number of the radio frequency sub-signals and the number of the output ports are the same. The radio frequency sub-signals are transmitted to the output ports, respectively. Since different radio frequency sub-signals are transmitted from the same input port to the output ports in different paths, the radio frequency sub-signals corresponding to different output ports have different phase delays and amplitudes. As a result, the radio frequency sub-signals having the different phase delays and amplitudes are transmitted to antennas respectively connected to the output ports through the different output ports, so that the different antennas may form wave beams corresponding to the phase delays and amplitudes of the received radio frequency sub-signals. The wave beams of the different antennas in the antenna array perform energy synthesis, and are finally synthesized into one wave beam transmitted in a fixed direction (i.e., the radio frequency signal). The radio frequency signals are input into the Butler matrix from different input ports, and transmission directions of corresponding wave beams are different. Therefore, by selecting different input ports of the Butler matrix in the direction adjusting unit to input the radio frequency signals, it may be possible to adjust a transmission direction of a wave beam of each antenna in the antenna array. As a result, the transmission direction of the radio frequency signal transmitted by the antenna array may be adjusted, so as to improve the directivity of the radio frequency signal. The Butler matrix formed by the transmission lines is a passive multiple wave beams forming network with low loss and simple forming process, and thus the transmission direction of the radio frequency signal may be adjusted through a simple structure and a utilization rate of the signal may be improved.

Figure 23:
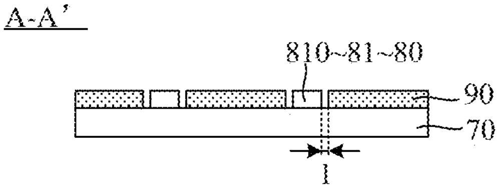
FIG. 23 is a cross-sectional view taken along the A-A' direction in FIG. 22.

In a case where the antenna layer is disposed on a side of the light-emitting layer proximate to the light exit surface of the display device, the antenna layer may block the light emitted by the light-emitting layer to a certain extent, so that there is a transmittance difference between a portion covered by the antenna layer and a portion uncovered by the antenna layer. Thus, for example, referring to FIG. 23, the display device further includes at least one (e.g., one) dummy pattern 90. The dummy pattern 90 is disposed in a same layer as the antenna layer 80, and there is a gap I everywhere between the dummy pattern 90 and the antenna layer 80. The dummy pattern 90 also has a mesh structure, which is similar to the antenna in antenna layer 80. The transmittance difference between the portion covered by the antenna layer 80 and the portion uncovered by the antenna layer 80 may be eliminated by providing the dummy pattern 90, thereby avoiding the above problem.

Figure 24:
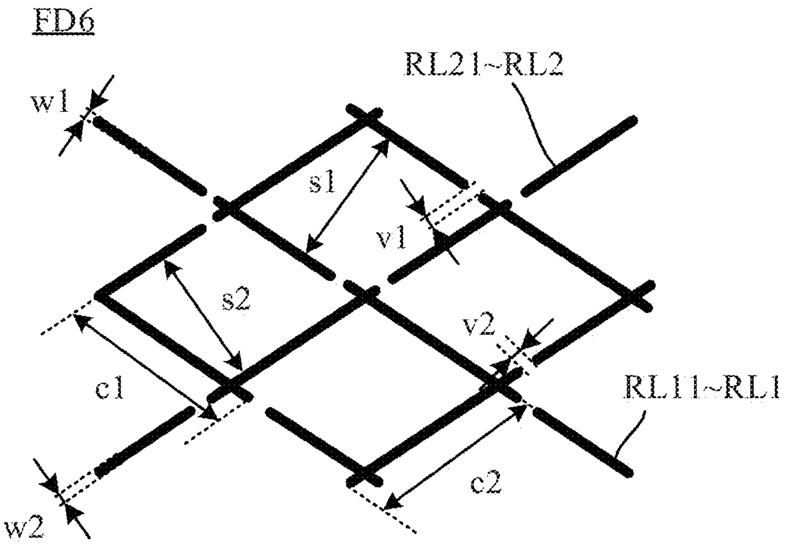
FIG. 24 is an enlarged view of a region FD6 in FIG. 22.

For example, the dummy pattern 90 and the antenna layer 80 may be formed by a single patterning process. For example, referring to FIG. 24, the dummy pattern includes a plurality of first traces RL1 with substantially parallel extending directions and a plurality of second traces RL2 with substantially parallel extending directions. The plurality of first traces RL1 and the plurality of second traces RL2 form the mesh structure, and the mesh structure is the same as the mesh structure of the antenna layer 80. Accordingly, any first trace RL1 is substantially parallel to any first conductive line, and any second trace RL2 is substantially parallel to any second conductive line. A distance s1 between any two adjacent first traces RL1 is greater than or equal to 1/10 of the wavelength of the radio frequency signal, and is less than or equal to 1/5 of the wavelength of the radio frequency signal. A distance s2 between any two adjacent second traces RL2 is greater than or equal to 1/10 of the wavelength of the radio frequency signal, and is less than or equal to 1/5 of the wavelength of the radio frequency signal. The mesh structure of the dummy pattern is provided the same as the mesh structure of the antenna in the antenna layer, which may reduce the transmittance difference to the maximum extent, and is conducive to improving the display effect of the display device.

Although there are distances between any two adjacent first traces RL1 and between any two adjacent second traces RL2, the formed mesh structure is still arranged at relatively dense intervals (e.g., at intervals of tens of micrometers or less) in a macroscopic view. Therefore, the formed dummy pattern may be equivalent to the reference ground of the antenna layer to a certain extent. Based on this, for example, referring to FIG. 24, at least one (e.g., each) first trace RL1 includes a plurality of first trace segments RL11. A length c1 of the at least one (e.g., each) first trace segment RL11 is less than or equal to 1/2 of the wavelength of the radio frequency signal, and a distance v1 between any two first trace segments RL11 that are adjacent and located in a same line is 5 times to 20 times a width w1 of the first trace RL1. At least one (e.g., each) second trace RL2 includes a plurality of second trace segments RL21. A length c2 of the at least one (e.g., each) second trace segment RL21 is less than or equal to 1/2 of the wavelength of the radio frequency signal, and a distance v2 between any two second trace segments RL21 that are adjacent and located in a same line is 5 times to 20 times a width w2 of the second trace RL2. The dummy pattern only includes bending traces formed by a limited number of trace segments that are connect to each other through the above arrangement. Moreover, any two adjacent bending traces are insulated from each other, and do not form a continuous flat conductor, so as not to interfere with the radiation of the antenna layer.

It can be understood that the dummy pattern is only used to eliminate the transmittance difference, and is not used for radiation. Therefore, the dummy pattern is insulated from the antenna layer, and there is the gap everywhere between the dummy pattern and the antenna layer in structure. A value of the gap should be set within a reasonable range. If the gap is too large, there is a visualization risk at a position where the gap is located. If the gap is too small, it may be not ensured that the dummy pattern is insulated from the antenna layer, and an excessively small gap may increase the process difficulty in the manufacturing process, which is not conducive to controlling cost and controlling a product yield. Thus, for example, referring to FIG. 23, a distance between the dummy pattern 90 and the antenna layer 80 may be set to be 10 times to 30 times the width w1 of the first trace RL1, such as any one of 11, 14, 16, 19, 23, 25 and 29 times the width w1 of the first trace RL1, so as to avoid the various problems described above.

For example, referring to FIG. 1, the display device DP includes a flexible connection board FB and a circuit board CB. One end portion of the flexible connection board FB is electrically connected to the bonding area BD of the display panel PNL. For example, the end portion is bonded to the bonding area BD of the display panel PNL, and is electrically connected to the plurality of signal input points in the bonding area BD of the display panel. The other end portion of the flexible connection board FB is electrically connected to the circuit board CB. The circuit board CB is electrically connected to the bonding area BD of the display panel PNL through the flexible connection board FB. The flexible connection board FB is disposed between the display panel PNL and the circuit board CB, so as to bend the circuit board CB to a side of the display device facing away from the light exit surface of the display device. For example, the flexible connection board FB may be a flexible printed circuit (FPC) board, a chip on flex or chip on film (COF), or other flexible connection structure that is capable of being bent. The circuit board CB may be a printed circuit board (PCB), a flexible circuit board, or the like.

In conjunction with the foregoing descriptions, each antenna disposed in the antenna layer of the display device DP may be led out to the bonding area BD of the display panel PNL through the conductive structure, and is coupled to the direction adjusting unit (e.g., the Butler matrix) or the millimeter wave chip through the plurality of signal input points disposed in the bonding area BD. In a case where the display device DP includes the Butler matrix and the radio frequency front end, the transmission lines forming the Butler matrix may be disposed on the flexible connection board FB, and the radio frequency front end and the baseband module may be disposed on the circuit board CB. In a case where the display device DP includes the millimeter wave chip, the millimeter wave chip may be disposed on the connection board FB, and the baseband module may be disposed on the circuit board CB. The above descriptions are only examples of a few feasible arrangements, and the above structures may also be arranged in other manners in the display device DP, which is not excessively limited in the embodiments of the present disclosure. Compared to a general antenna not fed in series, the antenna fed in series provided by the embodiments of the present disclosure has a more miniature structure, and accordingly, a smaller length of the bonding area (a dimension of the bonding area BD shown in FIG. 1 in the X direction being the length of the bonding area BD) may be achieved. If an equal gain is to be generated, the number of the antennas not fed in series required increases, and the number of feed ports will also increase, so as to achieve the same effect as the antenna fed in series provided by the embodiments of the present disclosure. However, an increase in the number of the feed ports of the antenna with the non-series-fed structure may result in an increase in the length of the bonding area. For example, for the millimeter wave antenna at approximately 28 GHz, the length of the bonding area corresponding to the antenna with the non-series-fed structure needs to be increased to approximately 45 mm, while the length of the bonding area corresponding to the antenna fed in series may be controlled at approximately 30 mm. With continued reference to FIG. 1, the flexible connection board FB is bonded to the bonding area BD, and an increase in the length of the bonding area BD has a poor effect on the bonding of the flexible connection board FB. For example, in a case where the length of the bonding area BD is too long, if the circuit board CB is bent to the side of the display device facing away from the light exit surface of the display device, the flexible connection board FB has a great risk of warping or cracking at a portion thereof located in the bonding area BD, which may be prone to failure in the electrical connection between the flexible connection board FB and the display panel PNL, and affect the bending yield of the display device. In addition, in the process of manufacturing the display device DP, it is desirable that a size of the bonded flexible connection board FB is as small as possible for transfer between production line equipment. If the size and a weight of the flexible connection board FB are both larger (compared with a size and a weight of the display panel PNL), sticking or dropping may occur in a transfer process, which affects the process and finally affects the yield. Therefore, based on the above considerations, the antenna fed in series provided by the embodiments of the present disclosure has a higher cost performance and is more conducive to engineering implementations.

The above description is only specific embodiments of the present disclosure, but the scope of protection of the present disclosure is not limited thereto. Any changes or replacements that a person skilled in the art could conceive of within the technical scope of the present disclosure shall be included in the protection scope of the present disclosure. Therefore, the protection scope of the present disclosure shall be subject to the protection scope of the claims.

What is claimed is:

1. An antenna, comprising:

at least one feed line including a first feed line and a second feed line;

a plurality of first patch units serially connected to the first feed line in an extending direction of the first feed line; and a plurality of second patch units serially connected to the second feed line in an extending direction of the second feed line, wherein a second patch unit of the plurality of second patch units is perpendicular to a first patch unit of the plurality of first patch units;

at least one of the first feed line and the plurality of first patch units has a mesh structure, the second feed line and the plurality of second patch units each have the mesh structure, and the mesh structure is composed of a plurality of conductive lines;

a distance between two conductive lines of the plurality of conductive lines that are adjacent and do not intersect is greater than or equal to a maximum width of any conductive line of the plurality of conductive lines, and is less than or equal to a minimum width of any feed line of the at least one feed line; and the antenna is configured to transmit a radio frequency signal, and the distance between the two conductive lines of the plurality of conductive lines that are adjacent and do not intersect is less than or equal to ⅕ of a wavelength of the radio frequency signal, and is greater than or equal to 1/10 of the wavelength of the radio frequency signal.

2. The antenna according to claim 1, wherein the first feed line includes a plurality of first conductive lines with substantially parallel extending directions and a plurality of second conductive lines with substantially parallel extending directions, and the plurality of first conductive lines and the plurality of second conductive lines constitute the mesh structure;

the plurality of first patch units each include a plurality of third conductive lines with substantially parallel extending directions and a plurality of fourth conductive lines with substantially parallel extending directions, and the plurality of third conductive lines and the plurality of fourth conductive lines constitute the mesh structure; and a first conductive line of the plurality of first conductive lines, a second conductive line of the plurality of second conductive lines, a third conductive line of the plurality of third conductive lines and a fourth conductive line of the plurality of fourth conductive lines are each one of the plurality of conductive lines.

3. The antenna according to claim 2, wherein the first conductive line is substantially parallel to the third conductive line; and the second conductive line is substantially parallel to the fourth conductive line.

4. The antenna according to claim 1, wherein the plurality of first patch units are alternately connected in series to the first feed line at two sides thereof, and the first patch unit of the plurality of first patch units is non-perpendicular to the first feed line.

5. The antenna according to claim 1, further comprising:

at least one impedance matching unit, an impedance matching unit of the at least one impedance matching unit being coupled to a feed line of the at least one feed line, wherein the at least one impedance matching unit has the mesh structure.

6. The antenna according to claim 5, wherein the impedance matching unit is connected to an end portion of the feed line.

7. The antenna according to claim 6, wherein the impedance matching unit is in a shape of a regular polygon; and the impedance matching unit is symmetric with respect to an extending line of the feed line.

8. The antenna according to claim 7, wherein the impedance matching unit has a groove, the end portion of the feed line proximate to the impedance matching unit is connected to a bottom of the groove, and there is a gap between the feed line and each of two sidewalls of the groove.

9. The antenna according to claim 8, wherein a distance between the two sidewalls of the groove is in a range of 1.4 times to 1.8 times a width of the feed line; and a depth of the groove is in a range of 0.5 times to 2.25 times the width of the feed line.

10. A display device having a light exit surface, the display device comprising:

a dielectric layer;

a pixel circuit layer located on a side of the dielectric layer away from the light exit surface; and an antenna layer located on a surface of the dielectric layer proximate to the light exit surface, the antenna layer including at least one antenna array, and an antenna array of the at least one antenna array being configured to transmit the radio frequency signal, wherein the antenna array includes a plurality of antennas each according to claim 1, and the plurality of antennas in the antenna array are arranged sequentially in a direction perpendicular to a thickness direction of the display device.

11. The display device according to claim 10, wherein the at least one antenna array includes a plurality of antenna arrays, the plurality of antenna arrays are arranged sequentially in the direction perpendicular to the thickness direction of the display device, and a distance between any two adjacent antenna arrays of the plurality of antenna arrays is in a range of ¼ to ¾ of the wavelength of the radio frequency signal.

12. The display device according to claim 10, further comprising:

a direction adjusting unit coupled to the antenna array, and the direction adjusting unit being configured to adjust a direction of the radio frequency signal transmitted by the antenna array.

13. The display device according to claim 12, wherein the direction adjusting unit includes transmission lines arranged in a form of Butler matrix; and the Butler matrix includes a plurality of input ports and a plurality of output ports, an output port of the plurality of output ports is coupled to the antenna in the antenna array, the output port communicates with the plurality of input ports of the Butler matrix, and the output port and each input port of the plurality of input ports have a different connection path.

14. The display device according to claim 10, further comprising:

a dummy pattern disposed in a same layer as the antenna layer, and there is a gap between the dummy pattern and the antenna layer; wherein the dummy pattern has the mesh structure.

15. The display device according to claim 14, wherein the dummy pattern includes a plurality of first traces with substantially parallel extending directions and a plurality of second traces with substantially parallel extending directions, and the plurality of first traces and the plurality of second traces constitute the mesh structure; and a distance between any two adjacent first traces of the plurality of first traces is greater than or equal to 1/10 of the wavelength of the radio frequency signal, and is less than or equal to ⅕ of the wavelength of the radio frequency signal, and a distance between any two adjacent second traces of the plurality of second traces is greater than or equal to 1/10 of the wavelength of the radio frequency signal, and is less than or equal to ⅕ of the wavelength of the radio frequency signal.

16. The display device according to claim 15, wherein a first trace of the plurality of first traces includes a plurality of first trace segments, a length of a first trace segment of the plurality of first trace segments is less than or equal to ½ of the wavelength of the radio frequency signal, and a distance between any two first trace segments of the plurality of first trace segments that are adjacent and located in a same line is in a range of 5 times to 20 times a width of the first trace; and a second trace of the plurality of second traces includes a plurality of second trace segments, a length of a second trace segment of the plurality of second trace segments is less than or equal to ½ of the wavelength of the radio frequency signal, and a distance between any two second trace segments of the plurality of second trace segments that are adjacent and located in a same line is in a range of 5 times to 20 times a width of the second trace.

17. The display device according to claim 15, wherein a distance between the dummy pattern and the antenna layer is in a range of 10 times to 30 times a width of a first trace of the plurality of first traces.

* * * * *